Dec. 7, 1948.　　　　K. A. BROWNE　　　　2,455,654
MULTIPLE THERMOCOUPLE ARRANGEMENTS
Filed March 27, 1946
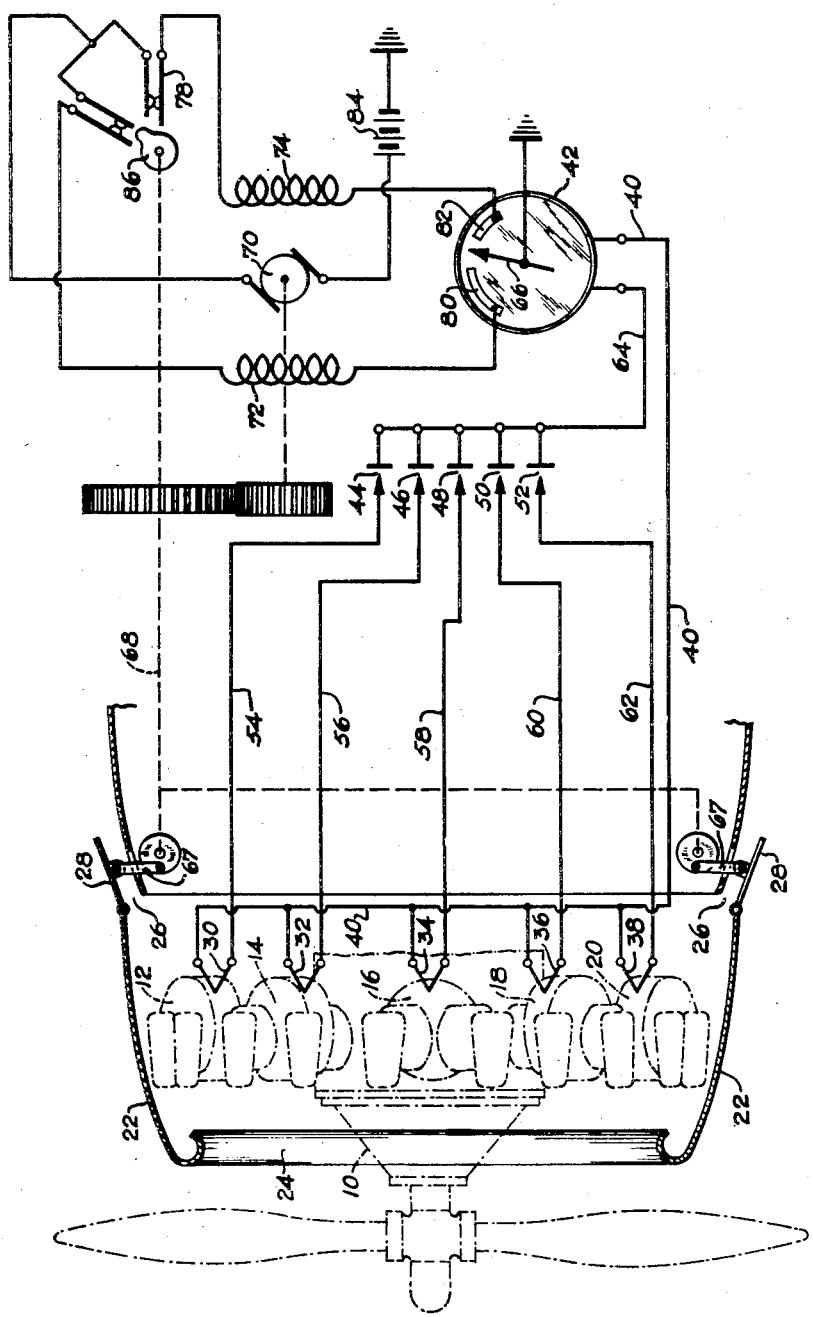
INVENTOR.
KENNETH A. BROWNE.
BY
ATTORNEY Patented Dec. 7, 1948

2,455,654

UNITED STATES PATENT OFFICE 2,455,654

MULTIPLE THERMOCOUPLE ARRANGEMENTS

Kenneth A. Browne, Lakewood, Ohio, assignor to Wright Aeronautical Corporation, a corporation of New York Application March 27, 1946, Serial No. 657,421

6 Claims. (Cl. 236—69)

This invention relates to temperature measuring and/or control systems and is directed to a system in which a single measuring device automatically measures only the highest of several temperatures. The invention is illustrated and described in connection with a temperature control system for an air cooled aircraft engine. However, the invention is of general application and may be used wherever it is desired to measure and/or use for control purposes only the highest of several temperatures.

Air cooled aircraft engines are commonly provided with adjustable cowl flaps at the rear of the engine to control the engine temperature. The highest engine temperatures occur in the cylinder heads of the engine and the cylinder head temperatures generally vary from cylinder to cylinder. Also, the highest engine temperature does not always occur in the same cylinder head but generally changes with changes in aircraft flight conditions. With the present invention, a plurality of temperature responsive means, each responsive to the temperature of one of the cylinder heads, are connected to a single measuring device in such a manner that said device automatically measures only the temperature of the hottest cylinder head. The temperature thus measured is used for controlling the flow of engine cooling air by adjusting the cowl flaps.

Specifically, the invention comprises a plurality of spaced thermocouples, each having their two terminals connected to a common electric measuring device with a rectifier in one of the terminal connections of each thermocouple. Each rectifier is connected in the circuit in such a manner that it is adapted to pass the electric current from its associated thermocouple and does not pass current in the reverse direction.

Other objects of this invention will become apparent upon reading the annexed detailed description of the drawing which schematically illustrates the invention applied to means for measuring cylinder head temperatures of an aircraft engine and for controlling the cowl flaps of said engine in accordance with the maximum cylinder head temperature.

Referring to the drawing, 10 indicates a conventional air cooled aircraft engine having a plurality of cylinders and associated cylinder heads of which cylinder heads 12, 14, 16, 18 and 20 are visible in the drawing. For simplicity, only those cylinder heads visible in the drawing will be considered in the following description of the invention.

The engine is surrounded by an annular cowl 22 having an air entrance opening 24 and an annular discharge opening 26 at the rear of the engine. Cowl flaps 28 are arranged to control the magnitude of the discharge opening 26. Each cylinder head is provided with a thermocouple, preferably located so as to be responsive to the maximum temperature of its associated cylinder head. As schematically illustrated, cylinder heads 12, 14, 16, 18 and 20 are provided with similar thermocouples 30, 32, 34, 36 and 38 respectively. The low electric potential terminal of each thermocouple is connected to a conductor 40 which, in turn, is connected to one terminal of a high resistance electric meter 42 responsive to the electric current flow therethrough as e. g. a voltmeter. The high potential terminals of the thermocouples 30, 32, 34, 36 and 38 are connected to one terminal of rectifiers 44, 46, 48, 50 and 52 by conductors 54, 56, 58, 60 and 62 respectively. The other terminal of each rectifier is connected to the other terminal of the meter 42 by a conductor 64.

With this construction, the thermocouples are connected in parallel to the meter 42 with a rectifier in the circuit of each thermocouple. Also, as illustrated, each rectifier is arranged to pass the electric current of its associated thermocouple and prevents flow of current in the reverse direction. The particular type of rectifier and electric meter 42 form no part of the invention but it is essential that the electric resistance of the meter 42 be quite large compared to the resistance offered by the rectifiers to current flow therethrough in their low resistance direction and to the resistance of the various conductor leads.

With this arrangement, the voltage across the meter 42 is a measure of the highest thermocouple voltage. For example, neglecting the voltage drop across the rectifiers and the voltage drop in the various conductors and considering only thermocouples 30 and 32, if the voltage across the thermocouple 30 is larger than the voltage across the thermocouple 32, the electric potential of conductors 54 and 64 will be higher than that of conductor 56 and, therefore, the meter 42 will only measure the voltage resulting from the thermocouple 30. Also, the rectifier 46 will prevent current flow from the high voltage thermocouple 30 through the low voltage thermocouple 32. Similarly, if the voltage across the thermocouples 34, 36 and 38 are also less than the voltage across thermocouple 30, the meter 42 will be unaffected by the thermocouples 34, 36 and 38, the rectifiers 48, 50 and 52 preventing electric current flow from the then high voltage thermocouple 30 to the lower voltage thermocouples 34, 36 and 38, respectively. Accordingly, the deflection of the pointer 66 of the meter 42 is always a measure of the temperature at the hottest thermocouple regardless of which thermocouple happens to be hottest. The meter 42 may be calibrated to read temperature directly.

At this point, it should be noted that, as far as the rectifier connections are concerned, it is only necessary that each rectifier be connected so that it is arranged to pass the electric current of its associated thermocouple and not in the reverse direction. For example, the direction of the rectifiers, relative to the meter 42, may be reversed from that illustrated in the drawing but then the rectifiers would have to be connected to the low voltage terminals of their associated thermocouples instead of to their high voltage terminals.

As schematically illustrated, the cowl flaps 28 are operatively connected by means including links 67 to a shaft 68 which, in turn, is drivably connected to an electric motor 70. The motor 70 is provided with a pair of windings 72 and 74 connected to the motor through limit switches 76 and 78 respectively. The winding 72, when energized, is arranged to effect operation of the motor 70 in a flap-closing direction and the winding 74, when energized, is arranged to effect operation of the motor 70 in a flap-opening direction. In order to automatically control the energization of the windings 72 and 74, the meter 42 is provided with a pair of spaced arcuate contacts 80 and 82 adapted to be engaged by the meter pointer 66 when it moves to one side or the other of the position illustrated in the drawing.

The system is so arranged that when the maximum thermocouple voltage exceeds a predetermined value, the pointer 66 engages the contact 82 to close a circuit through the winding 74 and source of electric energy 84 whereby the motor 70 operates to effect an opening adjustment of the cowl flaps 28. In this way, the rate of cooling air flow over the engine 10 is increased in order to reduce the engine temperature. Similarly, when the maximum thermocouple voltage drops below a predetermined value, the pointer 66 engages the contact 80 to close a circuit through the winding 72 and source of energy 84 whereupon the motor 70 operates to effect a closing adjustment of the cowl flaps 28. When the maximum engine temperature is within a desired range, the pointer 66 is disposed between the contacts 80 and 82 and no adjustment of the flaps 28 takes place. The limit switches 76 and 78 are arranged to be opened by a cam 86 driven by the motor 70 when the flaps 28 are respectively fully closed and fully opened thereby preventing energization of their associated windings 72 and 74 when the flaps occupy these extreme positions.

With the aforedescribed structure, the meter 42 automatically measures the temperature of the hottest thermocouple independently of the temperatures at the other thermocouples and there is no current flow from the hottest thermocouple to the cooler thermocouples. In addition, the deflection of the meter pointer 66 operates to adjust the position of the cowl flaps with changes in the maximum engine temperature regardless of which cylinder head happens to have the highest temperature at any one time. At this point, it should be noted that the particular manner in which the measurement of the meter 42 is used to control the cowl flaps 28 forms no part of the present invention.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Apparatus for measuring the highest of the temperatures at a plurality of spaced points, said apparatus comprising a plurality of thermocouples each responsive to the temperature at one of said points, an electric meter to which said thermocouples are connected in parallel, and a plurality of rectifiers each connected in the circuit of one of said thermocouples, so as to pass the electric current from its associated thermocouple but not in the reverse direction.

2. Apparatus for measuring the highest of the temperatures at a plurality of spaced points, said apparatus comprising a plurality of thermocouples each responsive to the temperature at one of said points, an electric meter to which said thermocouples are connected in parallel, and a plurality of rectifiers each connected in the circuit of one of said thermocouples so as to pass the electric current from its associated thermocouple but not in the reverse direction, said meter having an electric resistance substantially larger than the individual resistances of said rectifiers in the direction in which said rectifiers are designed to pass current.

3. Apparatus for measuring the highest of the temperatures at a plurality of spaced points, said apparatus comprising a plurality of similar thermocouples each responsive to the temperature at one of said points, an electric meter to which said thermocouples are connected in parallel, and a plurality of rectifiers each connected in the circuit of one of said thermocouples so as to pass the electric current from its associated thermocouple but not in the reverse direction, said meter having an electric resistance substantially larger than the individual resistances of said rectifiers to current flow in the direction in which said rectifiers are designed to pass current.

4. Apparatus for measuring the highest of the temperatures at a plurality of spaced points, said apparatus comprising a plurality of similar thermocouples each responsive to the temperature at one of said points, an electric meter to which said thermocouples are connected in parallel in such a manner that each thermocouple by itself would cause current to flow in the same direction through said meter, and a plurality of rectifiers each connected in the circuit of one of said thermocouples so as to pass the electric current from its associated thermocouple but not in the reverse direction.

5. Apparatus for measuring the highest of the temperatures at a plurality of spaced points, said apparatus comprising a plurality of similar thermocouples each responsive to the temperature at one of said points, an electric meter to which said thermocouples are connected in parallel in such a manner that each thermocouple by itself would cause current to flow in the same direction through said meter, and a plurality of rectifiers each connected in the circuit of one of said thermocouples so as to pass the electric current from its associated thermocouple but not in the reverse direction, said meter having an electric resistance substantially larger than the individual resistances of said rectifiers to current flow in the direction in which said rectifiers are designed to pass current.

6. A temperature control system comprising means movable for regulating the temperature at a plurality of spaced points, a plurality of thermocouples each responsive to the temperature at one of said points, electric means responsive to the electric current flow therethrough and to which said thermocouples are connected in parallel, said electric means being operative in response to changes in the flow of electric current therethrough for controlling said movable means, and a plurality of rectifiers each connected in the circuit of one of said thermocouples so as to pass the electric current from its associated thermocouple but not in the reverse direction, said electric means having an electric resistance substantially larger than the individual resistances of said rectifiers in the direction in which said rectifiers are designed to pass electric current.

KENNETH A. BROWNE.

REFERENCES CITED

The following references are of record in the file of this patent:

UNITED STATES PATENTS

| Number | Name | Date |
| --- | --- | --- |
| 1,266,627 | Renne | May 21, 1918 |
| 1,494,586 | Cary | May 20, 1924 |
| 1,544,259 | McQuaid et al. | June 30, 1925 |
| 1,766,608 | Crews | June 24, 1930 |
| 1,815,061 | Harsch et al. | July 21, 1931 |
| 1,869,429 | King et al. | Aug. 2, 1932 |
| 1,911,753 | Faust | May 30, 1933 |
| 1,985,967 | Wunsch | Jan. 1, 1935 |
| 2,058,491 | Noble | Oct. 22, 1936 |
| 2,081,762 | Nissen | May 25, 1937 |
| 2,168,599 | Beisel et al. | Aug. 8, 1939 |
| 2,420,969 | Newell | May 20, 1947 |